US007228200B2

(12) United States Patent
Baker et al.

(10) Patent No.: US 7,228,200 B2
(45) Date of Patent: Jun. 5, 2007

(54) APPARATUS, SYSTEM AND METHODS FOR DISPENSING PRODUCTS

(75) Inventors: Stuart C. Baker, Santa Ynez, CA (US); Daniel C. Finn, Valley Center, CA (US); Thomas F. Gaasch, Encinitas, CA (US); William K. Holmes, San Diego, CA (US)

(73) Assignee: Parata Systems, LLC, Durham, NC (US)

( * ) Notice: Subject to any disclaimer, the term of this patent is extended or adjusted under 35 U.S.C. 154(b) by 355 days.

(21) Appl. No.: 10/830,365

(22) Filed: Apr. 22, 2004

(65) Prior Publication Data

US 2005/0236418 A1    Oct. 27, 2005

(51) Int. Cl.
*G06F 17/00* (2006.01)

(52) U.S. Cl. ............. 700/236; 700/237; 700/242; 221/2; 221/4; 221/122; 221/133

(58) Field of Classification Search ............ 221/119, 221/21, 121, 122, 117, 133, 130, 7, 12, 4, 221/10; 700/236, 237, 242; 235/462.08, 235/381

See application file for complete search history.

(56) References Cited

U.S. PATENT DOCUMENTS

| | | | | |
|---|---|---|---|---|
| 919,927 | A | * | 4/1909 | Neumann et al. ............ 221/121 |
| 5,014,875 | A | | 5/1991 | McLaughlin et al. .......... 221/2 |
| 5,385,265 | A | * | 1/1995 | Schlamp ..................... 700/243 |
| 5,390,711 | A | * | 2/1995 | Murphey ..................... 700/237 |
| 5,431,299 | A | * | 7/1995 | Brewer et al. ................. 221/2 |
| 5,438,523 | A | * | 8/1995 | Humm et al. ............... 700/243 |
| 5,597,995 | A | | 1/1997 | Williams et al. ............ 235/375 |
| 5,713,485 | A | | 2/1998 | Liff et al. ...................... 221/2 |
| 5,812,410 | A | | 9/1998 | Lion et al. ............. 364/479.01 |
| 5,838,575 | A | | 11/1998 | Lion ..................... 364/479.01 |
| 6,068,156 | A | | 5/2000 | Liff et al. ....................... 221/7 |
| 6,152,364 | A | | 11/2000 | Schoonen et al. .......... 235/375 |
| 6,179,929 | B1 | * | 1/2001 | Gudini et al. ........... 134/167 R |
| 6,230,927 | B1 | | 5/2001 | Schoonen et al. ........... 221/10 |
| 6,256,967 | B1 | | 7/2001 | Hebron et al. ............... 53/501 |
| 6,283,322 | B1 | | 9/2001 | Liff et al. ....................... 221/7 |
| 6,330,491 | B1 | | 12/2001 | Lion .......................... 700/237 |
| 6,338,007 | B1 | | 1/2002 | Broadfield et al. ......... 700/231 |
| 6,352,200 | B1 | | 3/2002 | Schoonen et al. .......... 235/375 |
| 6,438,451 | B1 | | 8/2002 | Lion .......................... 700/237 |
| 6,439,423 | B1 | | 8/2002 | Suzuki ........................ 221/81 |
| 6,449,927 | B2 | | 9/2002 | Hebron et al. ............... 53/501 |

(Continued)

FOREIGN PATENT DOCUMENTS

WO    WO 01/21402 A1    3/2002

(Continued)

*Primary Examiner*—Gene O. Crawford
*Assistant Examiner*—Timothy Waggoner
(74) *Attorney, Agent, or Firm*—INCAPLAW; Terrance A. Meador

(57) ABSTRACT

Products are dispensed from a dispensing apparatus in which products marked with transaction information are received in a chain of bins. In response to control information synthesized from transaction information on the products in the bins and a dispense request, the chain is moved to place a bin at a dispensing station on the dispensing apparatus. At the dispensing station, a mechanism is operated in response to the control information to provide access to the bin. A product in the bin may then be retrieved.

43 Claims, 15 Drawing Sheets

U.S. PATENT DOCUMENTS

| | | | | |
|---|---|---|---|---|
| 6,464,142 | B1* | 10/2002 | Denenberg et al. | 235/440 |
| 6,471,089 | B2 | 10/2002 | Liff et al. | 221/13 |
| 6,529,801 | B1 | 3/2003 | Rosenblum | 700/237 |
| 6,547,097 | B1 | 4/2003 | Cavallaro et al. | 221/306 |
| 6,581,798 | B2 | 6/2003 | Liff et al. | 221/13 |
| 6,601,729 | B1 | 8/2003 | Papp | 221/25 |
| 6,650,964 | B2 | 11/2003 | Spano, Jr. et al. | 700/237 |
| 6,651,842 | B2 | 11/2003 | Collins et al. | 221/253 |
| 6,694,217 | B2* | 2/2004 | Bloom | 700/215 |
| 6,697,704 | B2 | 2/2004 | Rosenblum | 700/232 |
| 6,766,218 | B2 | 7/2004 | Rosenblum | 700/235 |
| 6,814,255 | B2 | 11/2004 | Liff et al. | 221/13 |
| 6,892,941 | B2 | 5/2005 | Rosenblum | 235/383 |
| 2003/0088332 | A1 | 5/2003 | Rosenblum | 700/232 |
| 2003/0093181 | A1 | 5/2003 | Rosenblum | 700/232 |
| 2003/0216831 | A1 | 11/2003 | Hart et al. | 700/235 |
| 2004/0164146 | A1 | 8/2004 | Rosenblum | 235/381 |
| 2004/0215369 | A1 | 10/2004 | Rosenblum | 700/235 |
| 2005/0021175 | A1 | 1/2005 | Bain | 700/236 |
| 2005/0023286 | A1 | 2/2005 | Pinney et al. | 221/123 |
| 2005/0049746 | A1 | 3/2005 | Rosenblum | 700/232 |

FOREIGN PATENT DOCUMENTS

| WO | WO 02/21402 | 3/2002 |
|---|---|---|
| WO | WO2005/005266 A2 | 1/2005 |

* cited by examiner

APPARATUS, SYSTEM AND METHODS FOR DISPENSING PRODUCTS

BACKGROUND

This specification concerns the dispensing of products from a dispensing apparatus in response to transaction information marked on the products.

Dispensing of products to consumers by automated means has been a feature of consumption-oriented economic infrastructure since at least the middle of the twentieth century, if not earlier. Initially, soft drinks and candy were provided from vending machines. Musical performance was dispensed to listeners by jukeboxes. Consumers obtained food from automats. One characteristic of these early machines was the physical and functional integration of sales activity, such as receipt of coins, with the automatic dispensation of products and services.

Currently, advances in transaction technology permit the sites of sale and dispensation to be physically separated, while providing great flexibility in functional and operational integration. Automation of the entire sale, including dispensing sold products, provides a manifold benefit. Distribution costs are cut, productivity is increased, and inventory and transaction data are efficiently managed and effectively documented.

However, as a result of advances in data processing, communications, and documentation, increasingly sophisticated sales transaction technologies have leapfrogged the technologies and modes of dispensing sold products, particularly in retail environments in which the consumers themselves retrieve or take possession of the products without having the products carried to them by an intermediary service. In this regard, "dispensing" refers to delivering or dealing out products from machines directly to consumers who have paid for them, and particularly to apparatus and systems from which consumers themselves take possession of such products.

A machine or apparatus for dispensing products in a retail environment must make the most efficient use of the space which it occupies. That is to say, it must exhibit a high density of products per machine unit volume. The apparatus must also integrate with automatic transaction means in order to provide efficient and effective delivery of the products which it dispenses, especially in those cases when specific products are to be dispensed to specific recipients. The machine's ability to integrate will also enhance its flexibility in terms of the variety of products that it can dispense and the variety of consumers it can dispense to. A dispensing machine invested with an appropriate degree of transaction functionality may also be able to operate autonomously, requiring integration only with inventory and transaction data management components. In cases where products, such as prescription drugs and devices, must be dispensed under privacy and regulatory constraints, the dispensing machine must also be capable of dispensing products securely to ensure safe delivery and satisfaction of the constraints.

SUMMARY

Products are distributed from a dispensing apparatus in which the products themselves or packages containing the products, marked with transaction information, are received in a chain of bins. In response to control information synthesized from a dispense request and transaction information on products or packages in the bins, the chain is moved to place a bin at a dispensing station on the dispensing apparatus. At the dispensing station, an access mechanism is operated in response to the control information to provide access to the bin. A product or a package in the bin may then be retrieved by or for an identified recipient.

SPECIFICATION

Dispensing Apparatus

Figure 1:
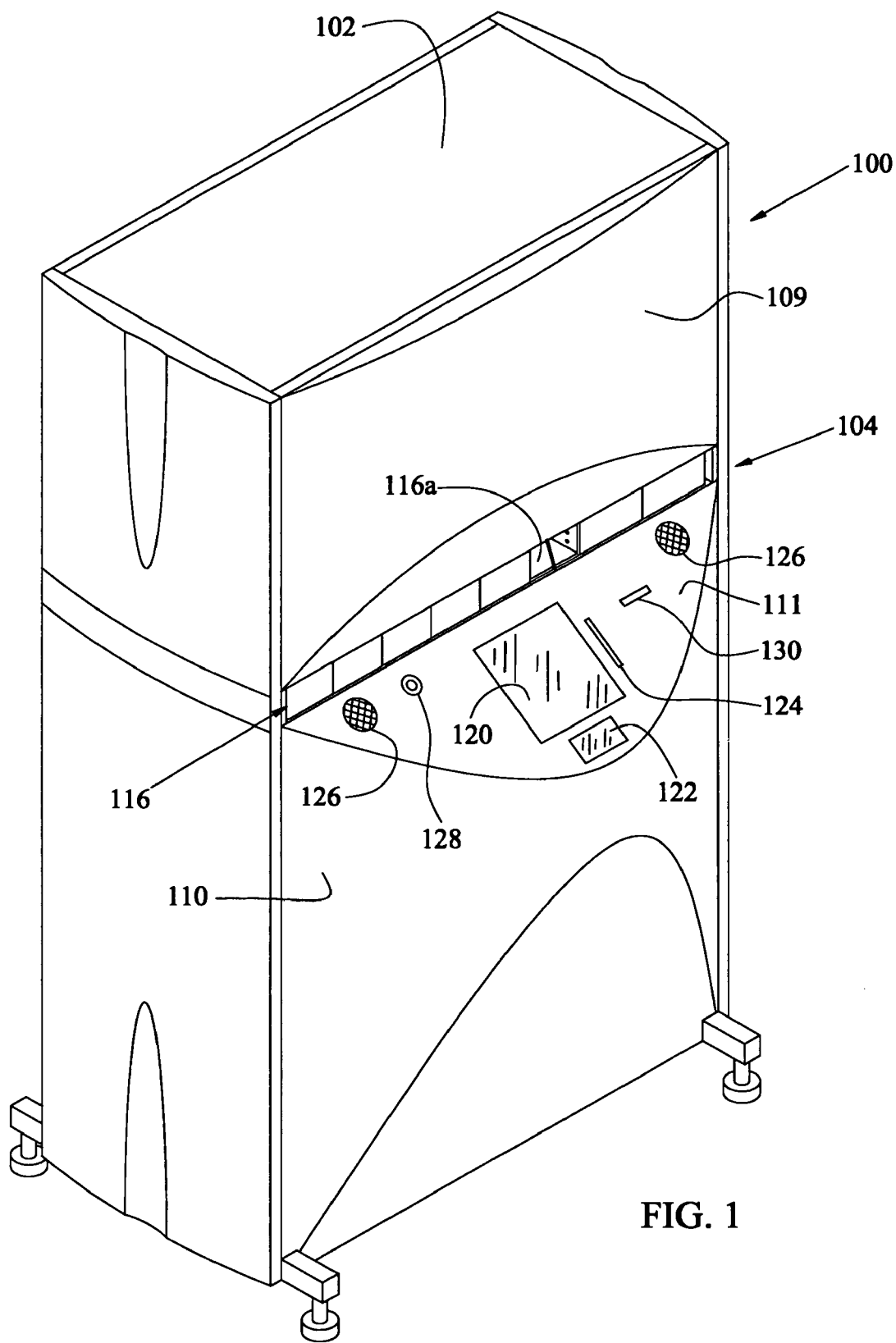
FIG. 1 is a front perspective view of a dispensing apparatus.
Figure 2:
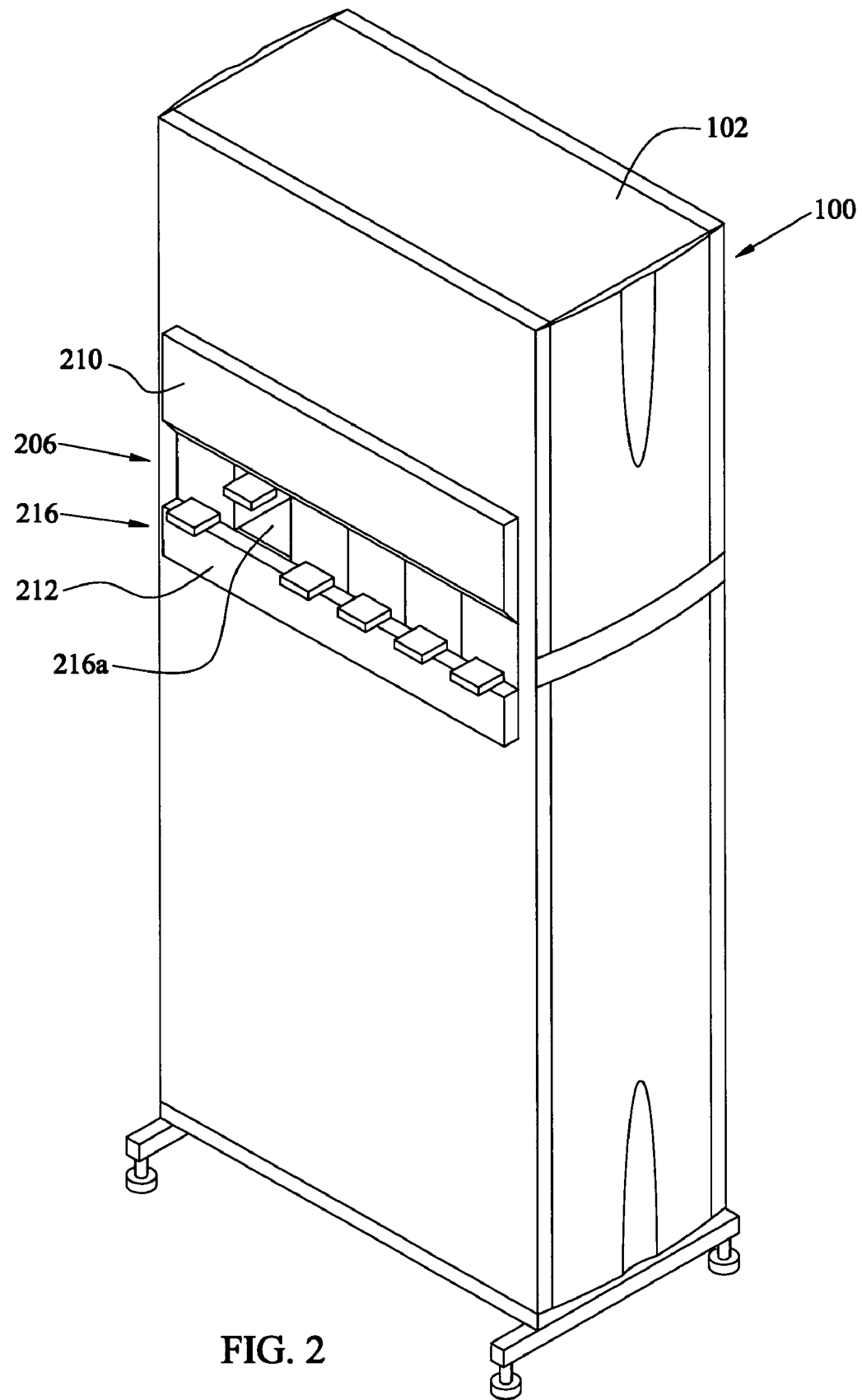
FIG. 2 is a rear perspective view of the dispensing apparatus of FIG. 1.

FIGS. 1 and 2 show a dispensing apparatus 100 having a housing, enclosure, or cabinet ("housing") 102, preferably although not necessarily, a six-sided one, made of sheet metal panels joined to each other and supported on a frame. The housing 102 is constructed so that the interior of the apparatus 100 is normally accessed by a user or consumer through a dispensing station 104 on the housing, and by authorized vending personnel through a loading station. Although FIG. 2 shows a loading station 206 on a side of the housing 102 opposite that where the dispensing station 104 is found, it is possible for the stations to be located on the same side of the housing, or even to share the same station location. Nevertheless, for the sake of illustration only, the stations 104 and 206 are shown at separate, oppositely situated locations.

The dispensing station 104 is positioned between a first shaped panel 109 and a second shaped panel 110. The second shaped panel has a surface 111 bordering the dispensing station. The dispensing station 104 may be constituted of an array 116 of locked or closed doors. The array 116 of doors may have one or more doors in it; the array is illustrated with eight doors, for example. The door 116a is shown opened for access. When a door at the dispensing station is opened to provide access to a product or package in a bin, the apparatus is said to "dispense" the product or package when the product or package is retrieved by or for a recipient.

The surface 111 which borders the dispensing station 104 provides access to interface instruments for conducting a transaction. These instruments may include, for example, a touch screen panel 120, a signature pad 122, a magnetic stripe (card) reader 124, speakers 126, a camera 128, and a receipt slot 130. The control panel may provide access to fewer or more instruments than those shown.

In the dispensing apparatus example shown in the figures, which represents the case where the stations 104 and 206 are on opposite sides of the apparatus 100, the loading station 206 is constituted of a first raised cover 210, a second raised cover 212 disposed beneath the cover 210, and an array 216 of locked or closed doors situated between the covers 210 and 212. One door 216a is shown open at the loading station.

Figure 3:
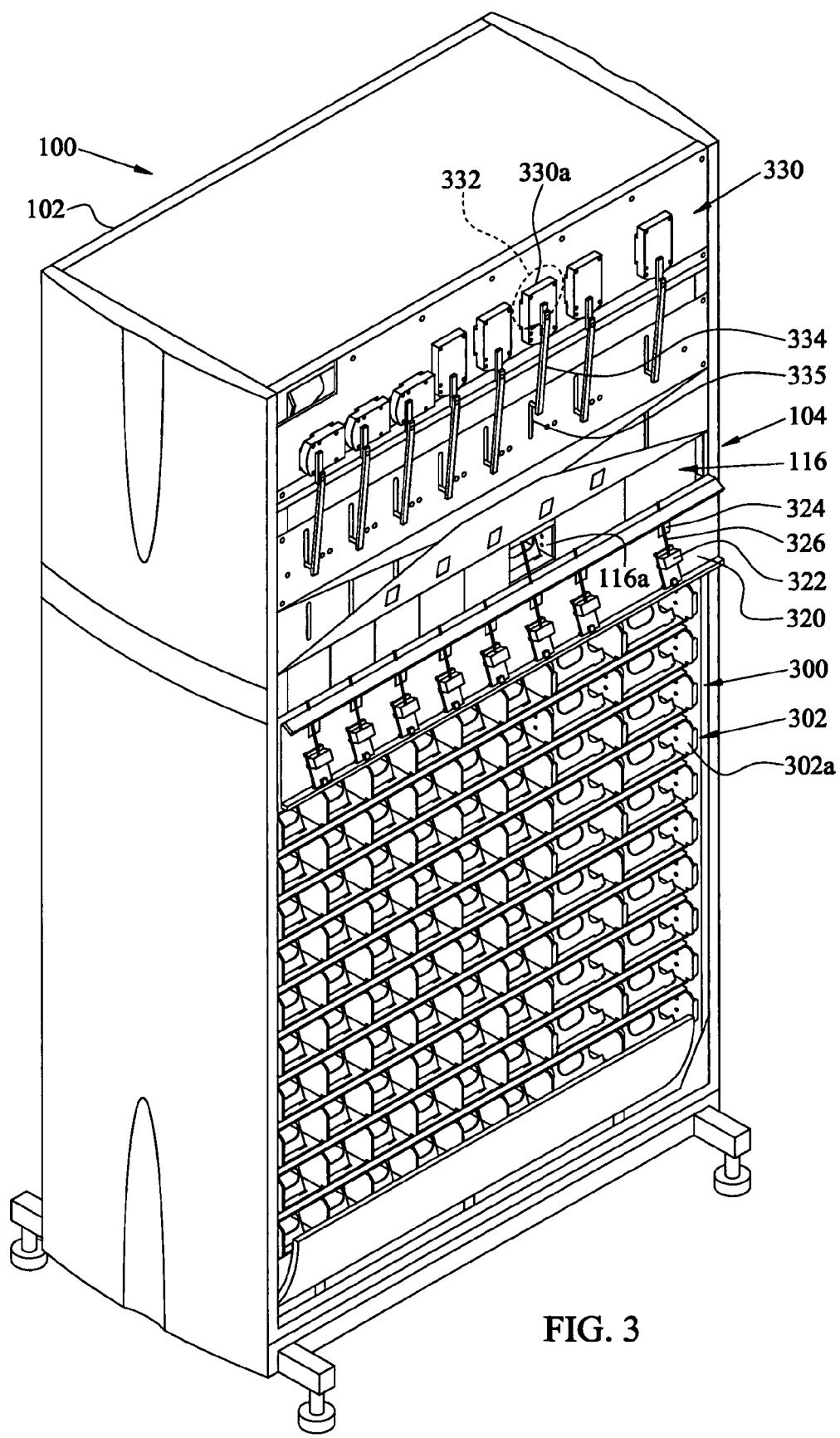
FIG. 3 is a front perspective view of the dispensing apparatus of FIG. 1, with a front cover partially removed to show details of a chain of bins and a dispensing station.
Figure 4:
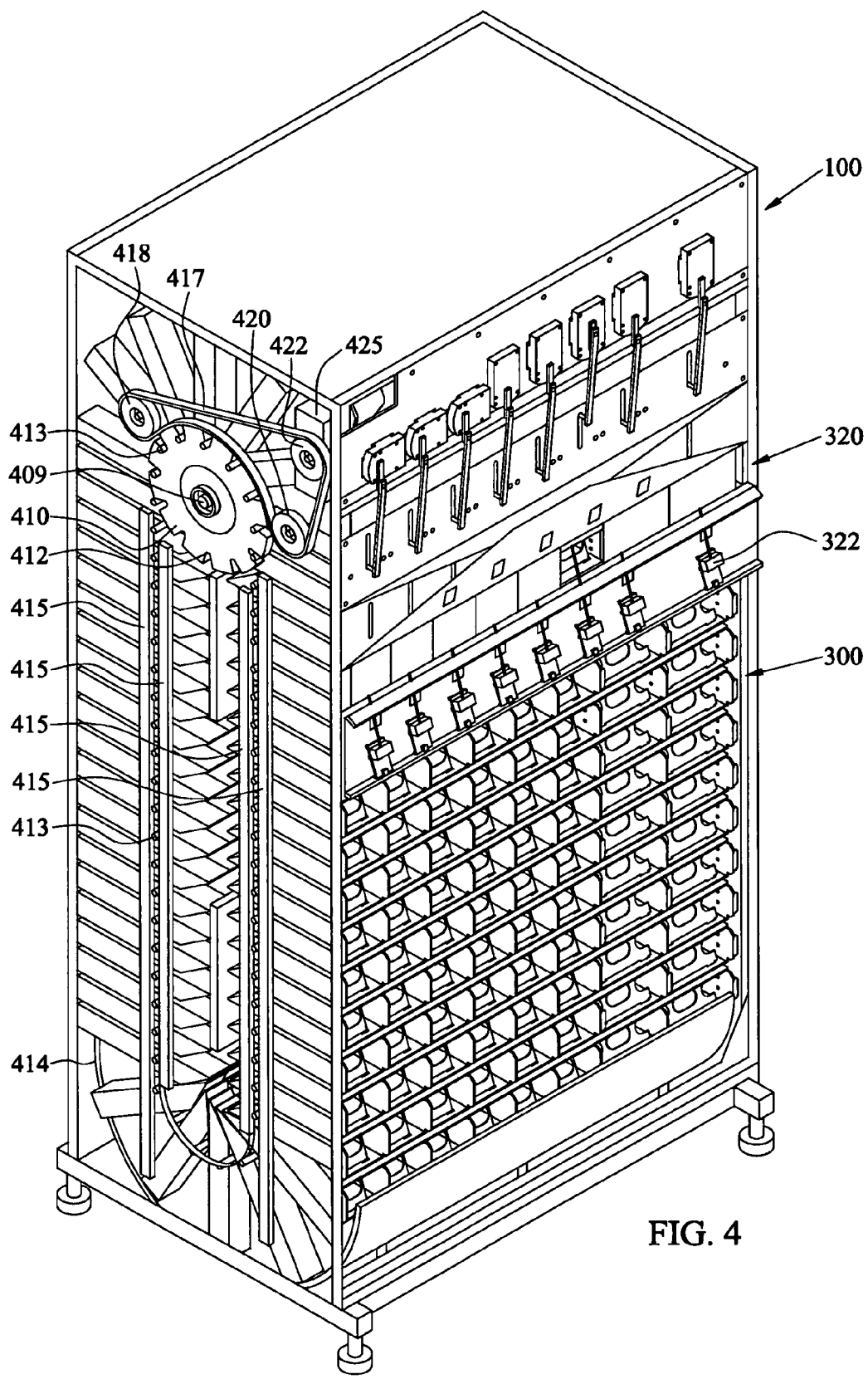
FIG. 4 is a perspective view toward a first side of the dispensing apparatus of FIG. 1, with front and side covers removed to show further details of the chain of bins and dispensing station.
Figure 5:
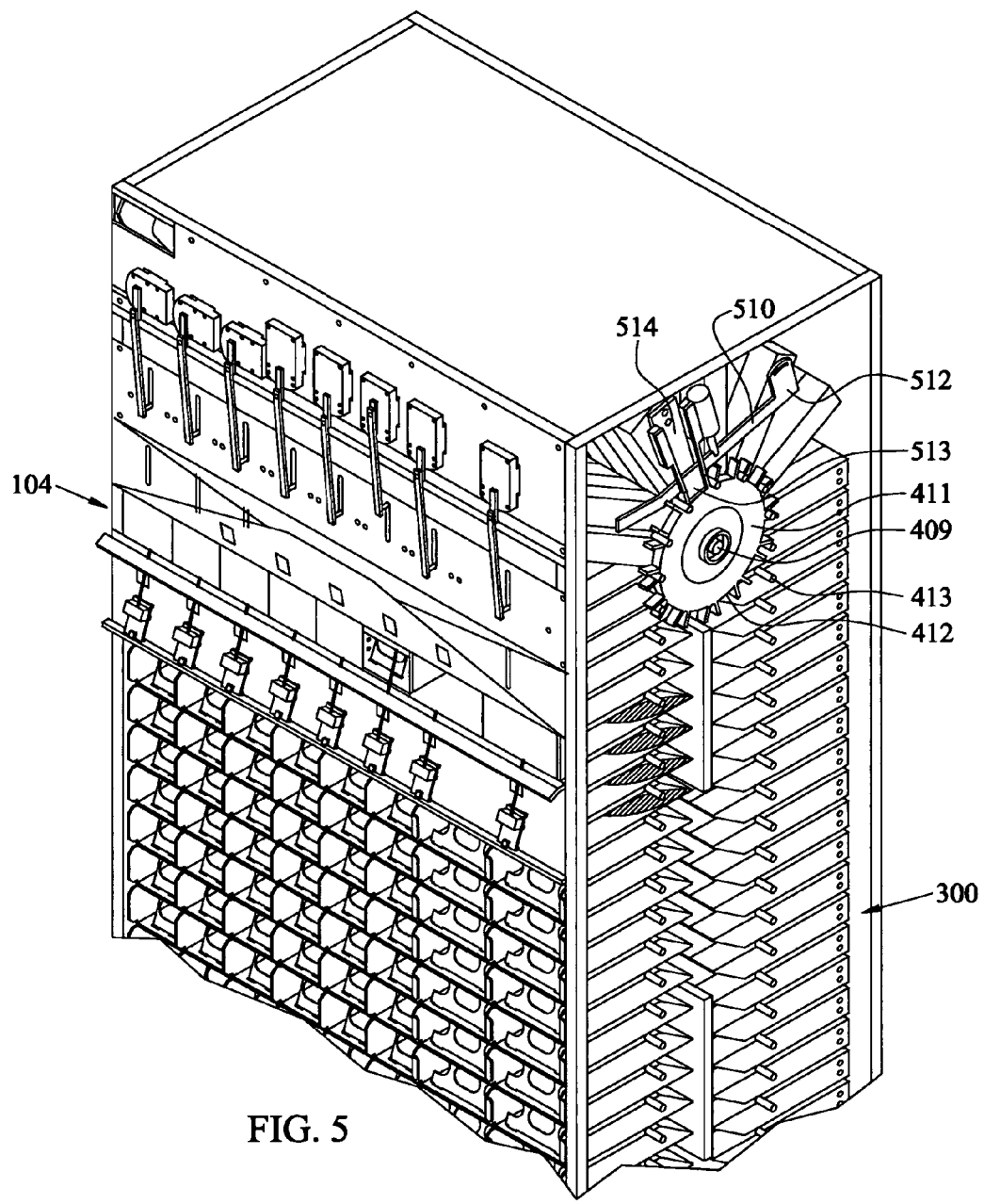
FIG. 5 is a perspective view toward a second side of the dispensing apparatus of FIG. 1, with front and side covers removed to show further details of the chain of bins.

In FIGS. 3, 4, and 5 panels of the housing 102 are removed to illustrate a mechanism constituted of a plurality of linked bins forming a chain 300 of bins that may be moved or transposed in either vertical direction. In this example, the ends of the chain 300 are linked together to form a continuous endless chain of bins. Alternatively, at least one link may be omitted, making the chain discontinuous. The bins are provided in a sequence of 1×n arrays; one array is indicated by reference numeral 302, and one bin in the bin array 302 is indicated by reference numeral 302a. In the example shown, the bin arrays are rows of bins in the chain 300. Each bin array may comprehend one or more bins.

The chain 300 of bins is moved by a mechanism in the housing 102 including at least one axle 409 (preferably substantially horizontal) and a pair of hubs mounted to the axle at each of its ends. One hub of the axle 409 is indicated by reference numeral 410, the other by 411. The hubs 410 and 411 of the axle 409 are supported for rotation in bearings (not shown) in the side panels of the housing 102. The hubs 410 and 411 include sprockets in their respective rims. A sprocket in each hub rim is indicated by reference numeral 412. The chain 300 is received over the hubs 410 and 411 in the upper end of the housing 102, with cylindrical retainers 413 at the ends of rods which link the bins together engaged by the sprockets 412. In the lower end of the housing, a semicircular chute 414 made of low friction material such as Teflon is held against the chain 300 in order to guide the chain as it rotates against the chute 414 and retain contents of the bins in the bins as the chain 300 rotates through a bottom arc. Alternatively, a sheet of low friction material can be tensioned against the chain 300 in the lower end of the housing 102. Still other means for retaining the contents of the bins in the bins through the bottom arc include wire springs in the bins or belts outside the bins. Two pairs of guides 415 secured to each of the side panels of the housing 102 form channels which receive the cylindrical retainers 413 and stabilize the chain as it is moved or transposed in the housing 102. The chain 300 is moved in either vertical direction by a drive mechanism including a belt 417 that engages the hub 410 that is visible in FIG. 4. The belt 417 is tensioned over the rim of the hub 410 and over rollers 418 and 420, and engages the output hub 422 of a reversible electric motor 425. When the chain 300 is stopped, it is retained in place by a retainer mechanism best seen in FIG. 5. The retainer mechanism includes a lock arm 510 rotatably secured at 512 to a side panel (not shown) of the housing 102. The arm has a dog 514 that engages the sprockets 412 on the rim of the hub 411. A solenoid 514 moves the arm 510 toward and away from the rim of the hub 411.

FIGS. 3, 4 and 5 also illustrate elements of the dispensing station 104 that are not visible in FIGS. 1 and 2. A panel 320 with raised elongate edges is secured to the frame of the housing 102 and extends across the width of the housing adjacent the dispensing location. An array of information sensors is supported on the panel 320 to sense or read information in the bins. One of the sensors is indicated by reference numeral 322. Preferably, the sensors are optical sensors such as bar code readers. Each sensor is given a line of sight into a respective bin by an aperture through the panel 320. The aperture for the sensor 322 is indicated by reference numeral 324, and its line of sight is indicated by 326.

The doors 116 cover a bin array at the dispensing location, each door covering a respective, individually-accessible bin. The doors may be unlocked or unsecured and opened by means of handles if dispensation of the products is not subject to security constraints. In other cases, security constraints may require locking of the doors while the constraints are satisfied. For dispensing constrained by security, the doors 116 are individually controlled by motors 330, with each motor coupled to open and close a door by a rotatable linkage. For example, the motor 330a has a member that it rotates as indicated at 332. The member is linked by a rotatable joint to an elongate arm 334. The arm 334 is, in turn, linked to the door 116a on a trunnion that rides up and down in the slot 335. The motor 330a operates in response to a command, rotating its member in the direction 332, which draws the arm 334 upwardly to the position shown in FIG. 3. The arm's upward motion draws the door 116a up, exposing the opening to the bin behind the door 116a and providing access to its contents. Another command reverses the sequence, moving the door 116a down and closing the opening to the bin. With the door closed, the motor is maintained in a locked position which prevents the door from being opened manually. Each of the doors at the dispensing location works in this way.

Figure 6:
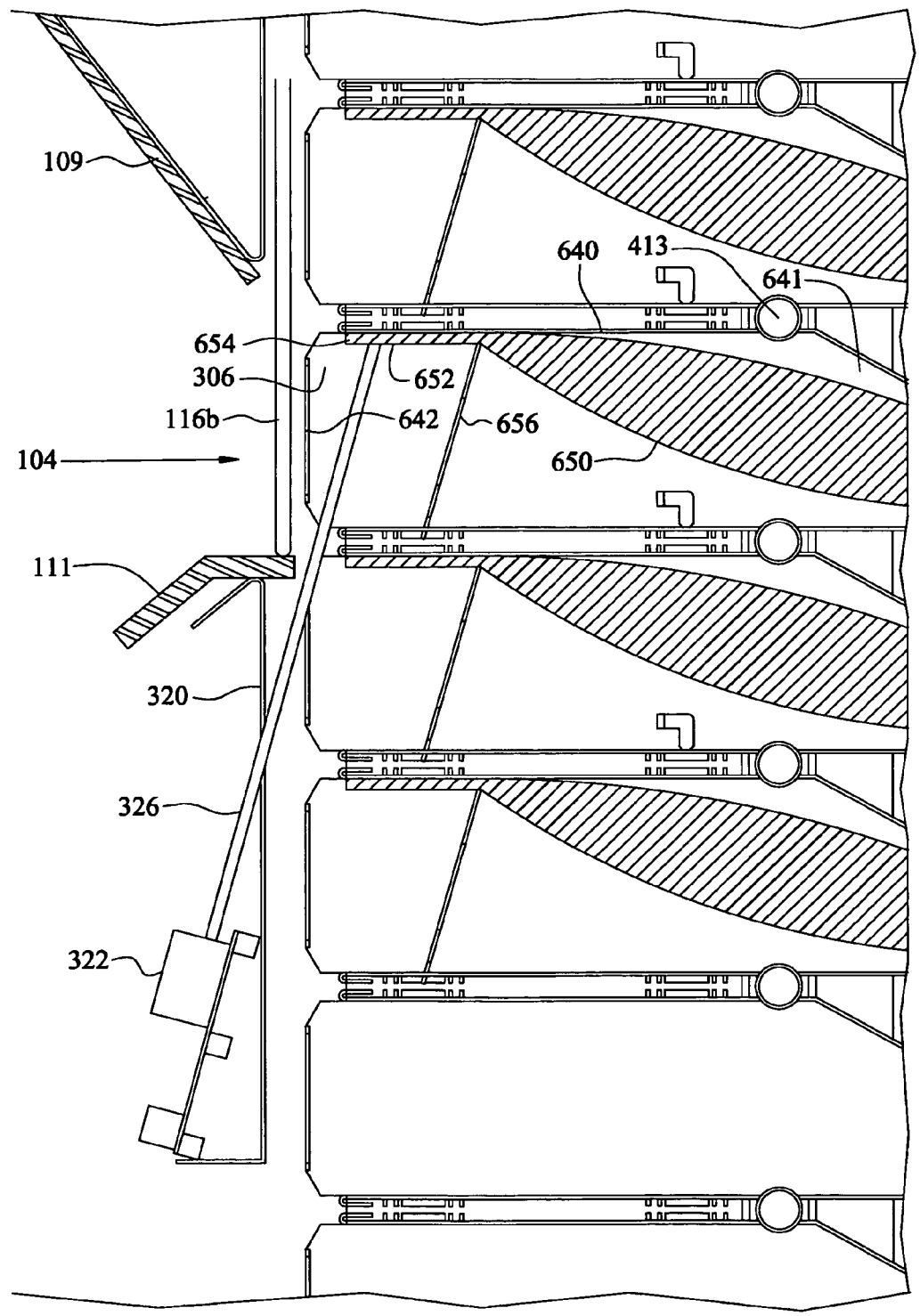
FIG. 6 is an enlarged, partially schematic side view that shows the structure and operation of the dispensing station.

FIG. 6 illustrates elements of the exemplary dispensing station described above with respect to FIG. 4. In this figure, a bin 306 is positioned at a closed dispensing station door 116b. The bin 306 is representative of all bins in the chain 300. The bin 306 is an elongated box 640 having a closed tapered end 641 and a rectangular open end 642. When a bin is positioned at a door, its open end faces the door. Each bin may contain a product or package retained at an information sensing location in the bin. For example, the bin 306 has disposed in it a package 650 (also shown alone in FIG. 7) with a thin end 652 on which transaction information 654 is printed or affixed or positioned. For example, the transaction information may be in the form of an optically-discernable bar code. The thin end 652 is urged to a predetermined information-reading position against a side of the elongated box 640 near its open end to retain the thin end 652 where the transaction information be sensed or read. When the bin 306 is at the dispensing station, the predetermined information-reading position is in the line of sight 326 of the sensor 322 adjacent the door 116b. In the example shown in these figures, a retainer 656 integral with the package 650 retains the package 650. Preferably, the package 650 is flexible, made of plastic film or reinforced paper, and the retainer 656 is semi-rigid, made of cardboard or thin plastic, so that it will buckle, flex, or bend. The retainer 656 has holes formed in it for easy insertion into and removal from a bin. The retainer 656 acts between a side of a bin and the thin end 654 such that the transaction information 654 is positioned in the line of sight 326 of the sensor 322. The sensor 322 is thus enabled to read the transaction information on a product or package in the bin 306 or, if the bin is empty, status information on the side of the bin in the line of sight 326. Such information may signify that the bin is empty.

A loading station for the dispensing apparatus may be separate from the dispensing station just described and located on an opposite side of the housing, as shown in FIGS. 1 and 2. In this case, the loading station is constituted of the same elements as the dispensing station, in an inverted relationship, because the endless chain configuration of the chain inverts the bins at the loading station (with respect to the bins at the dispensing station) and requires inversion of the information sensors at the loading station, with respect to the orientation of the information sensors at the dispensing station. That is not meant to so limit the application of the principles of the dispensing apparatus, and the dispensing and loading stations may be located on the same panel of the housing, in which case they would be identically configured and oriented. Or, the same station could be used to load and dispense products or packages.

FIG. 6 provides an example of a product intended to be dispensed from a dispensing apparatus such as the dispensing apparatus 100. The product is contained in the package 650 with a transaction information location on the thin end 652 where transaction information 654 is received. This is not meant to limit the application of these principles. The product in the bins may or may not be packaged. Alternatively, or in addition, the bins may be lined with coverings to protect their inner surfaces. Preferably the lining would be removable and extracted when the product or package is taken from a bin. The transaction information location may be on the product or a package or envelope containing it. In the case illustrated in FIG. 7, a label receives and retains transaction information related to the product. Thus, with reference to FIGS. 6 and 7, the package 650 is received or loaded in the bin 306 such that the label is situated at or near an information-reading position in the bin 306 where it can be read by the sensor 322 at the dispensing station 104 and by its counterpart at the loading station 206. The transaction information on a product or package may include, for example, an identification of the product, a price, an inventory number, and so on; it may also contain the identification of a recipient who has paid for the product, or who is authorized or required to receive it. The transaction information on the label and the bin status information may be coded in some standard format, and must be discernible by the information sensors at the dispensing and loading stations. For example, the transaction information and the bin status information may be on a label in the form of a bar code, on a device bearing an RF code, on an identification tag, or any equivalent. Further, the label may be written to as well as read from in situ. The product, package, or envelope is loaded into a bin such that the transaction information will be sensed at both the loading and the dispensing stations.

Figure 8:
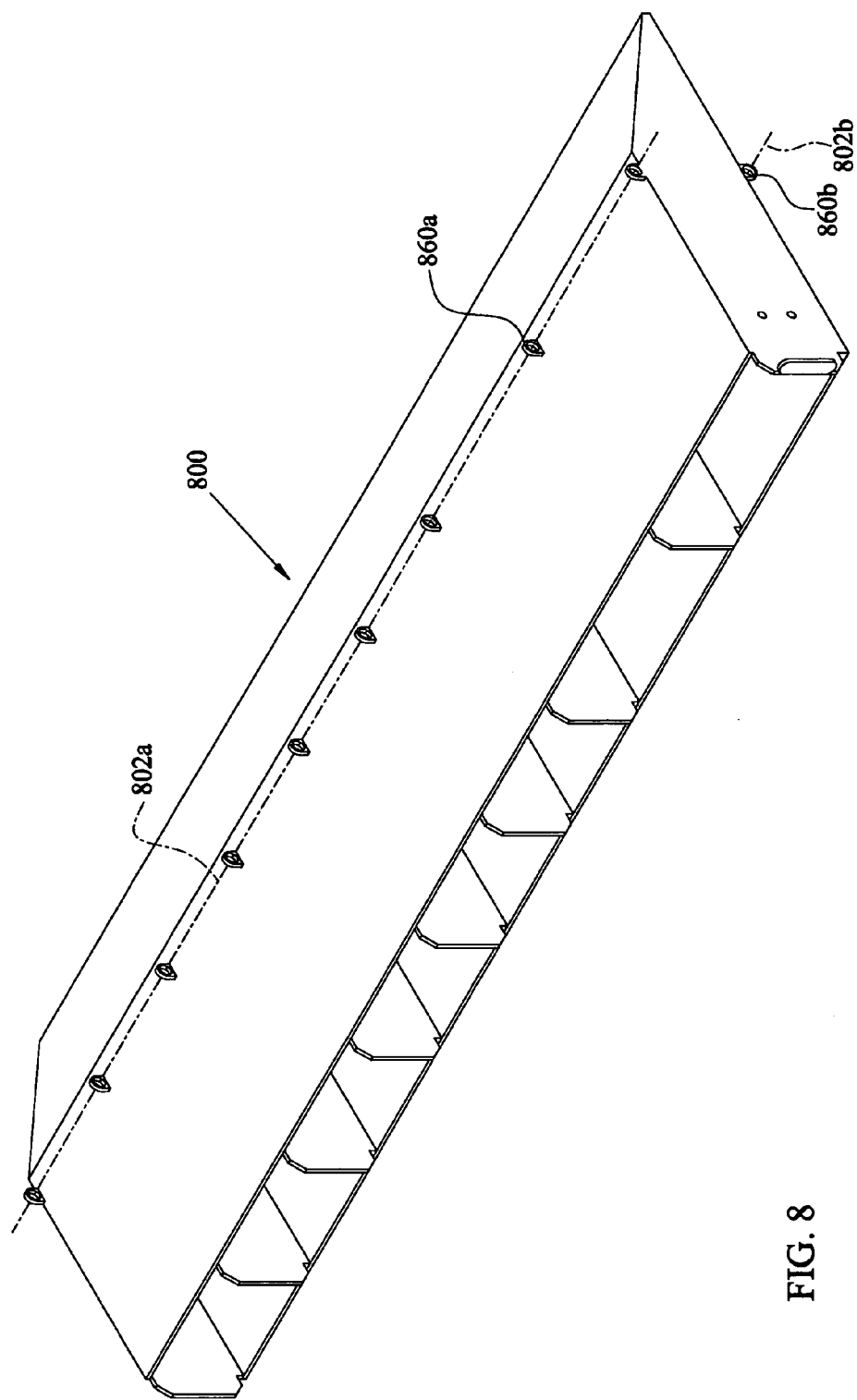
FIG. 8 is a side perspective view of an array of bins in a chain of bins.

The plurality of bins in the dispensing apparatus is assembled first into a plurality of bin arrays, such as the bin array 800 shown in FIG. 8, and then into a chain such as the chain 300 shown in FIG. 5. Each bin array is preferably, although not necessarily, one-dimensional and may contain one or more bins of the same or different widths. The bin arrays may be made of sheet metal or molded plastic. As seen in FIGS. 5 and 8, each side of a bin array has a plurality of coupling eyelets 860a and 860b disposed in two elongate alignments in alignment with the edge where the bins transition to their closed, tapered ends in the array. The coupling eyelets on one side of a bin array are aligned with a coupling eyelet alignment on an adjacent bin array and joined by a rod (not shown) so that the bin arrays are linked to form a chain of bin arrays. For example, the bin array of FIG. 8 is linked to one adjacent bin array by a rod (not shown) along the axis 802a, and to another adjacent bin array by another rod (not shown) along the axis 802b. The tapered ends of the bins permit those ends to be moved together and apart as the chain 300 travels around the axles at each end of the housing; see FIG. 4, for example.

Figure 7:
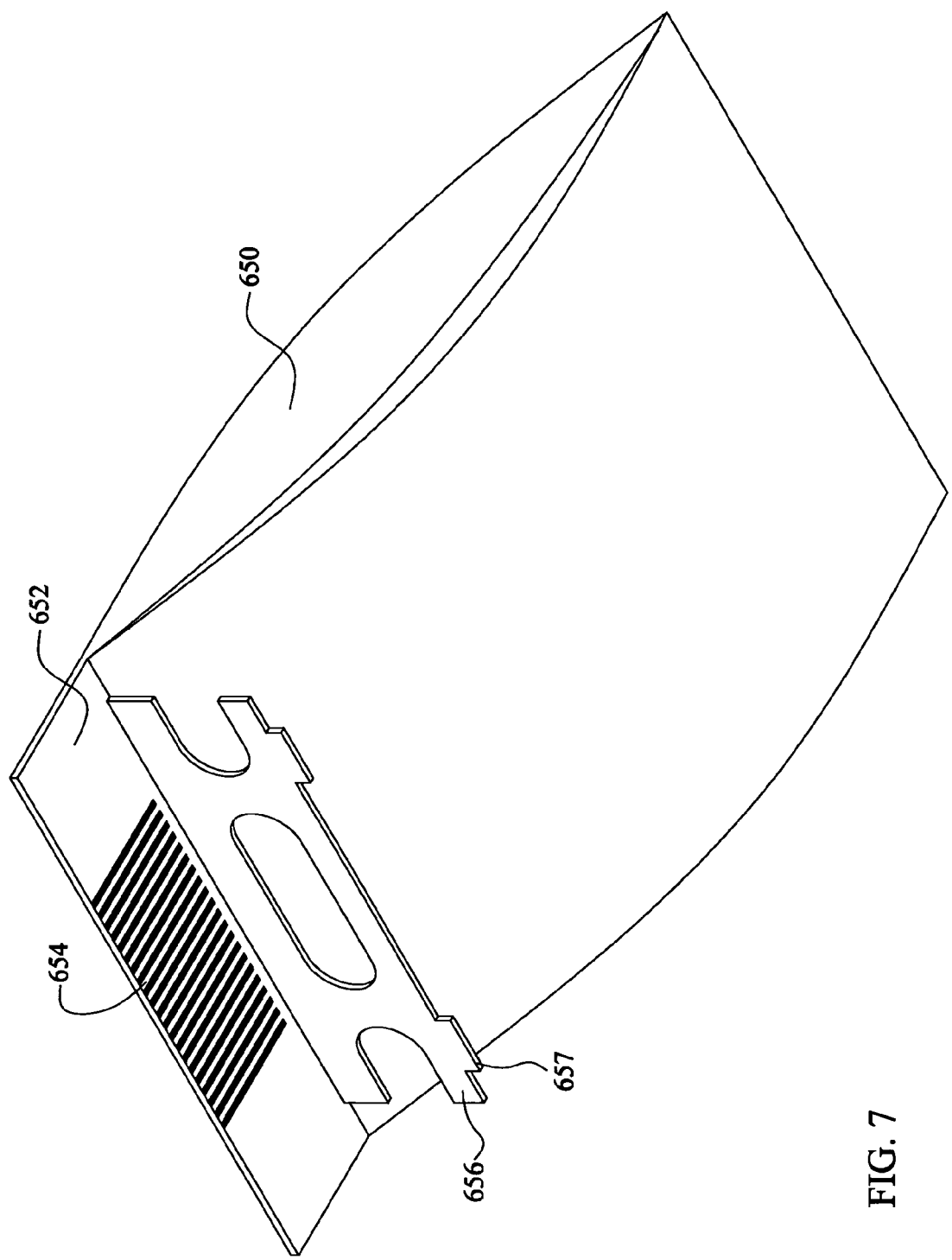
FIG. 7 is a side perspective view of a package for use with the dispensing apparatus of FIG. 1.
Figure 9:
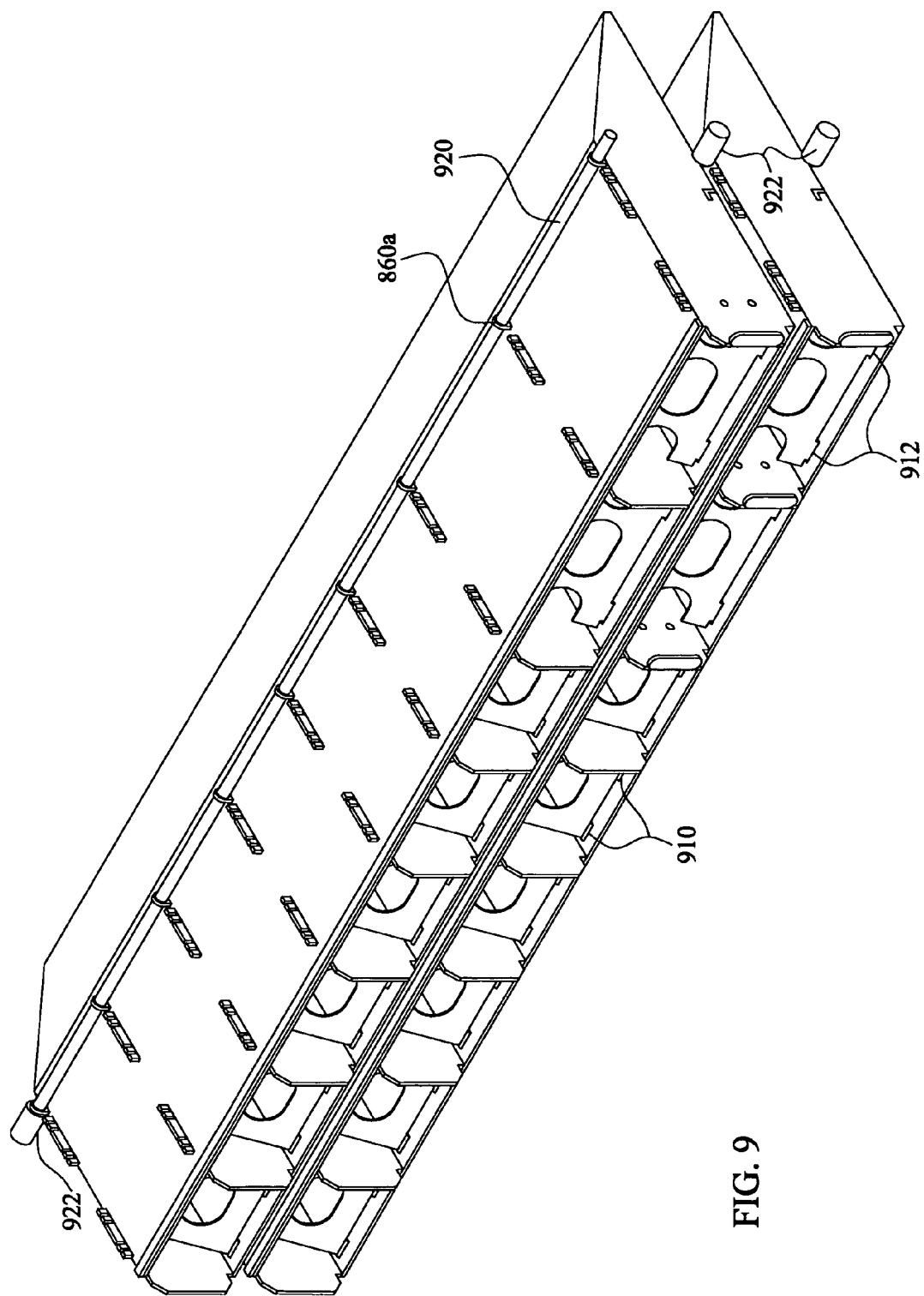
FIG. 9 is a side perspective view of a portion of the chain of bins.

FIG. 9 shows two bin arrays assembled as described into a chain portion. One rod 920 is shown received in eyelets 860a on one side of a bin. The rods are retained in the eyelets by cylindrical retainers 922 secured to the ends of the rods; one such retainer is shown on one end of the rod 920. These are the elements of the chain 300 that are engaged by the sprocketed drive mechanism shown in FIGS. 3 and 4. Also visible in FIG. 9 are two modes of retaining packages such as the package 650 in the bins. As seen in FIG. 7, the semi-rigid retainer 656 has two spaced-apart tabs 657 on its lower edge. These tabs may engage bumps 910 or slots 912 formed on or in a surface of each bin.

The chain configuration supports a particularly efficient use of the footprint area and volume of the dispensing apparatus 100, which makes the apparatus particularly useful for commercial retail environments. For example, presume that the apparatus has the rectangular configuration illustrated in FIGS. 1–4. We have designed such a dispensing apparatus with the following bin dimensions:

outside width=40.7 in.
outside depth=21.62 in.
outside height=78.00 in.
outside volume=68,668 in.$^3$
inside width=39.72 in.
inside depth=19.62 in.
inside height=75.00 in.
inside volume=58,448 in$^3$ and the following bin dimensions:
depth=9.25 in.
height=2.5 in.
width=37.52 in.
quantity=56 bins
total bin volume=48,588 in.$^3$ giving a utilization factor inside the apparatus of 48,448/58,448=83%, and outside the apparatus of 48,448/68,668=71%.

Processing System

Figure 10:
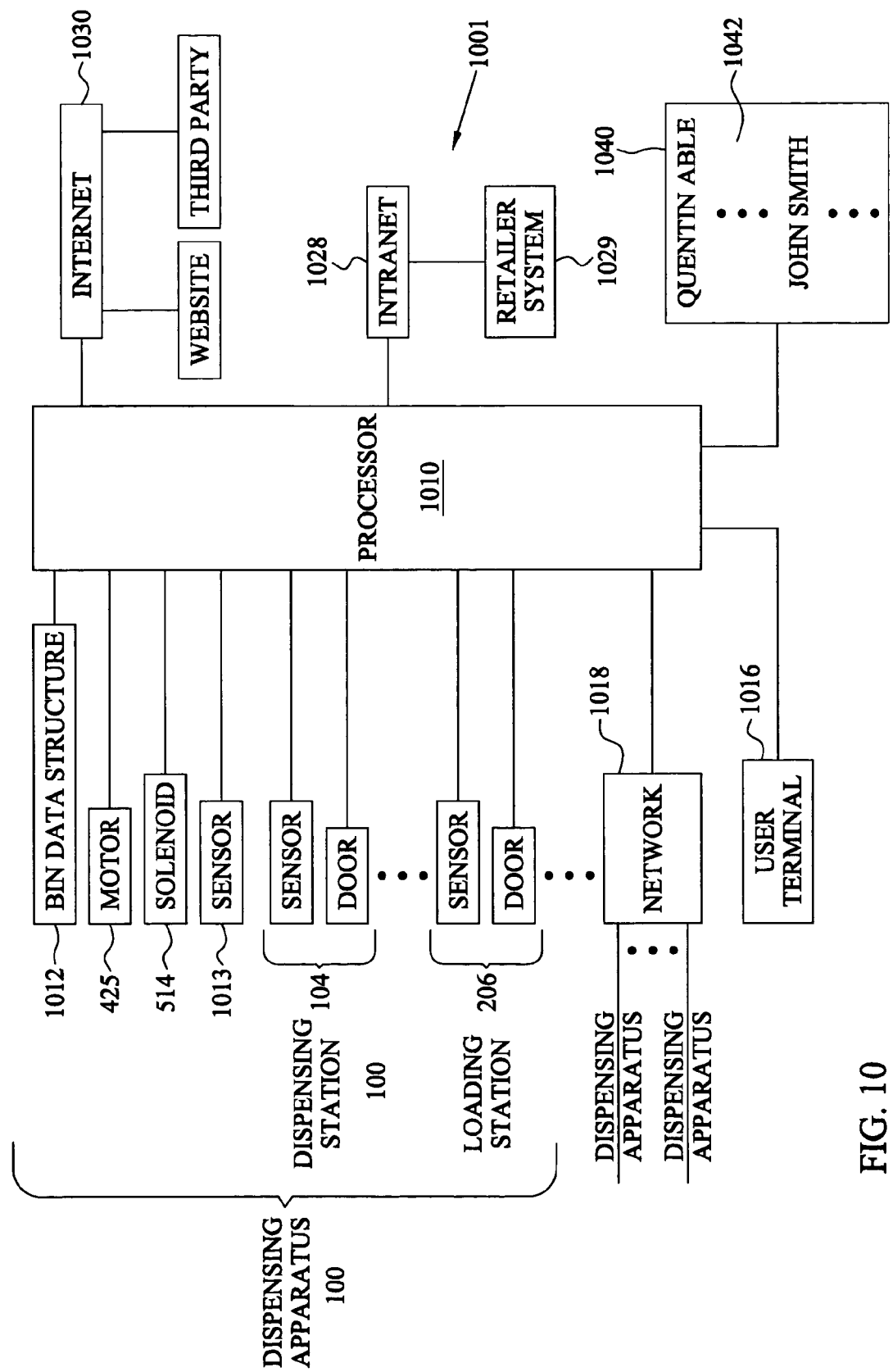
FIG. 10 is a system block diagram illustrating the integration of the dispensing apparatus with an automated transaction system.

FIG. 10 illustrates a processing system 1001 that may be connected in whole or in part to the dispensing apparatus 100 to control its operations. In this regard, one of the functions of the processing system 1001 is to act as a controller of the dispensing apparatus. However, as will become clear, this is but one of a number of functions which the processing system 1001 may perform in connection with the operation and use of one or more dispensing apparatus. In fact, the processing system 1001 has a manifold functionality that enables a dispensing apparatus to operate autonomously as a stand-alone dispensing system. The processing system 1001 may also constitute a functional node by which the dispensing apparatus may be integrated with other dispensing apparatus and other processing systems in an enterprise architecture or in a more widely-dispersed system.

The processing system 1001 may be wholly integrated into the structure of the dispensing apparatus, or may be located in whole or in part outside the dispensing apparatus. For illustration, the following discussion presumes that the processing system 1001 is integrated physically into the structure of the housing 102. But this is not intended to be limiting nor to exclude other possibilities. For example, the processing system 1001 may be in a kiosk to and may serve one or a plurality of dispensing apparatus from a kiosk separate from the dispensing apparatus.

Referring to FIG. 10, the processing system 1001 includes a programmable processor unit (hereinafter, "processor") 1010. The processor 1010 has connections to multiple devices, units, and networks. Some of these are shown in FIG. 10 as point-to-point connections for illustration and discussion only. In fact, connectivity at the device, module, and functional levels will be matters of design choice based on available technology and actual device and system configurations.

The processor 1010 maintains (in storage, not shown) programs and data structures for conducting transactions involving the dispensing apparatus 100, including loading and dispensing a product or products, as well as for other related functions. One data structure 1012 relates each bin of the plurality of bins in the chain 300 to its content status, which includes transaction information relevant to products or packages in the bin.

Bin array location information is provided by an information sensor 1013 located in the housing 102. The sensor 1013 is connected to the processor 1010 to provide location information relative to the chain 300. In this regard, the sensor 1013, at a known location in the housing 102, reads information from the sides of the bin arrays identifying the bin array that is currently at or passing the sensor's location. Such information may be as simple as uniquely marking one bin array as ROW 0 (the first row in a two-dimensional matrix having a number of rows equal to the number of bin arrays in the chain) and marking all other rows with a common mark. Then when the first row is sensed, a row count is initialized (or reinitialized) and incremented each time another row passes the sensing location.

Dispensing is initiated by the processor 1010 upon receipt of a request to dispense a product. Such a request is referred to as a "dispense request". A user terminal 1016 is connected to the processor 1010 to enable users to generate and send dispense requests to the processor 1010 and to receive information related to the transaction from or by way of the processor 1010. The user terminal may be located on a single dispensing apparatus for use with that apparatus, or, with that apparatus as master (or server), for use with that apparatus and one or more other dispensing apparatus (as slaves, or clients). The user terminal may also be located on a kiosk separate from any dispensing apparatus that it serves. Wherever located, the user terminal 1016 may, for example, include the set of input elements shown at the surface 111 in FIG. 1, including the card reader 124, the touch screen 120, the electronic pad 122 for receiving a signature, and the camera 128. Information regarding or related to the transaction may be provided by the user terminal 1016 to the user by, for example, the output elements shown at the surface 111, including the touch screen 120, the speakers 126, and the receipt printer 130. The processor 1010 is connected to receive the dispense request, and additional information, from the user terminal 1016. The information sensors and door motors at the loading station 206 and the dispensing station 104 are connected to the processor 1010 for operation thereby. The processor 1010 is also connected to control the operation of the motor 425 and solenoid 514, and thereby is enabled to cause the chain 300 to move or to be positioned for loading and dispensing operations. Similar connections for additional dispensing apparatus may be afforded by a multi-access configuration 1018 such as a bus or network. In this latter regard, the connections for the dispensing apparatus 100 would be made via 1018.

The processor 1010 is also connected to a local, private, or enterprise network ("intranet") 1028 for the retailer system 1029 whose products are dispensed. The processor 1010 may also be connected to a communication network 1030 in the form of, for example, a public telephone network or a wide area network, such as the Internet through which the dispensing apparatus can be accessed for receipt or delivery of information and or messages respecting or related to a transaction or the contents of one or more bins. For example, once a bin is loaded with a product or package, transaction information on the product or package may include an e-mail address at which a message may be delivered to notify a recipient of the message of the availability of the product for dispensation. Programming would enable the processor 1010 to compose and send such a message. Finally, the processor is connected to an output device 1040, such as a display or banner board, on which a list 1042 of recipients ("recipient list") of contents of the dispensing apparatus 100 may be provided. The list is maintained and updated by the processor 1012 as contents are loaded and dispensed.

Data Structure for Transaction Information

Figure 11:
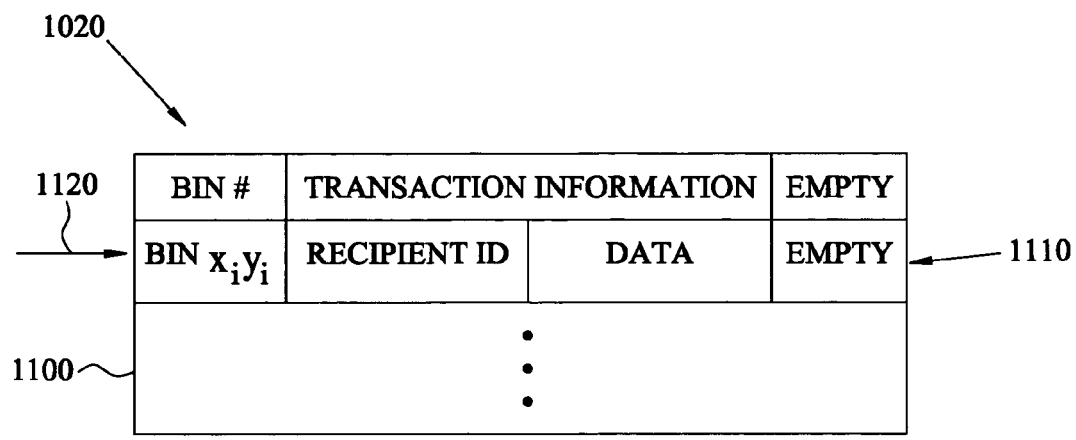
FIG. 11 is a schematic representation of a relational data structure containing transaction information.
Figure 12:
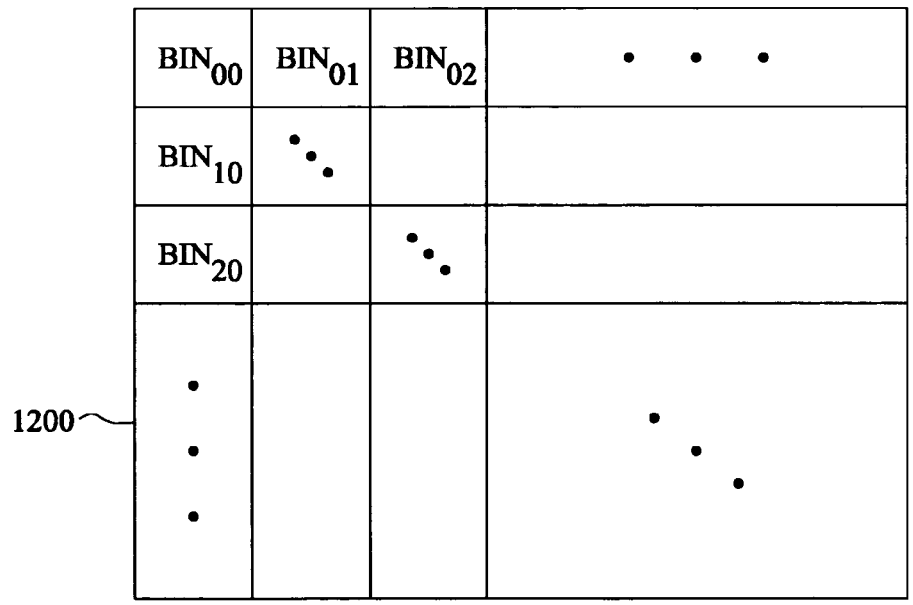
FIG. 12 is a schematic representation of a two-dimensional matrix relating bins in the chain of bins to the data structure of FIG. 11.

FIG. 11 illustrates an embodiment of the data structure 1020 containing transaction information that may be stored and accessed by the processor 1010 for management and control of the operation of a dispensing apparatus. The illustration shows a relational structure in the form of a table, but the relational structure may take other forms such as a list, a tree, a map, or any other data structure capable of organizing and systematically searching information in a database of transaction information. The table has rows, each row associated with a bin in the chain 300. Each row has a field Bin # in which a bin is identified, one or more fields for Transaction Information respecting the recipient of a product or package in the identified bin and other information about the product or package, and a field Empty denoting either that the bin is empty or that it holds a product, package, container, envelope, or the like. The Bin field lists the bins by an appropriate code in an order that can be quickly scanned. For example, the relational structure may represent a two-dimensional matrix of bins. In this regard, with reference to FIGS. 11 and 12, imagine that the chain 300 has one link removed and is laid flat on a supporting surface. In this aspect, it is manifest that the chain 300 corresponds to a two-dimensional matrix 1200 of bins, in which each bin array corresponds to a respective row in the matrix, and each bin is uniquely identified by its location in the matrix, e.g., by the identifier BIN $(x_i, y_j)$. Thus, the bin identifiers can be placed in the data structure 1012 as an ordered table, list, map, tree, or other equivalent structure easily and quickly scanned by program means executed by the processor 1010. The data structure 1012 relates BIN $(x_i, y_j)$ with the transaction information on any product, package, container, envelope, or the like loaded into the bin. The data structure 1012 supports further management of the chain 300. For example, respective cursors representing the dispensing and loading stations may be maintained and moved through the data structure 1012 to track the bin arrays currently positioned at or moving past the stations. With reference to FIG. 11, a cursor 1120 in the data structure 1100 would indicate that the bin array constituting the ith row ($x=x_i$) is at the dispensing station 104. Further, with the example shown, the processor 1010, using the values of $y_j$, is enabled to relate each door of the array 116 to a specific one of the bins in the ith row.

The transaction information in the data structure 1012 would include identification of the product and may include identification of a recipient of the product, price, inventory number, and so on. The transaction information may be obtained from a connection to a vendor system 1014 or from the information sensors at the loading station 106 reading transaction information from products as they are loaded into the bins.

Load and Dispense Operations

Figure 13A:
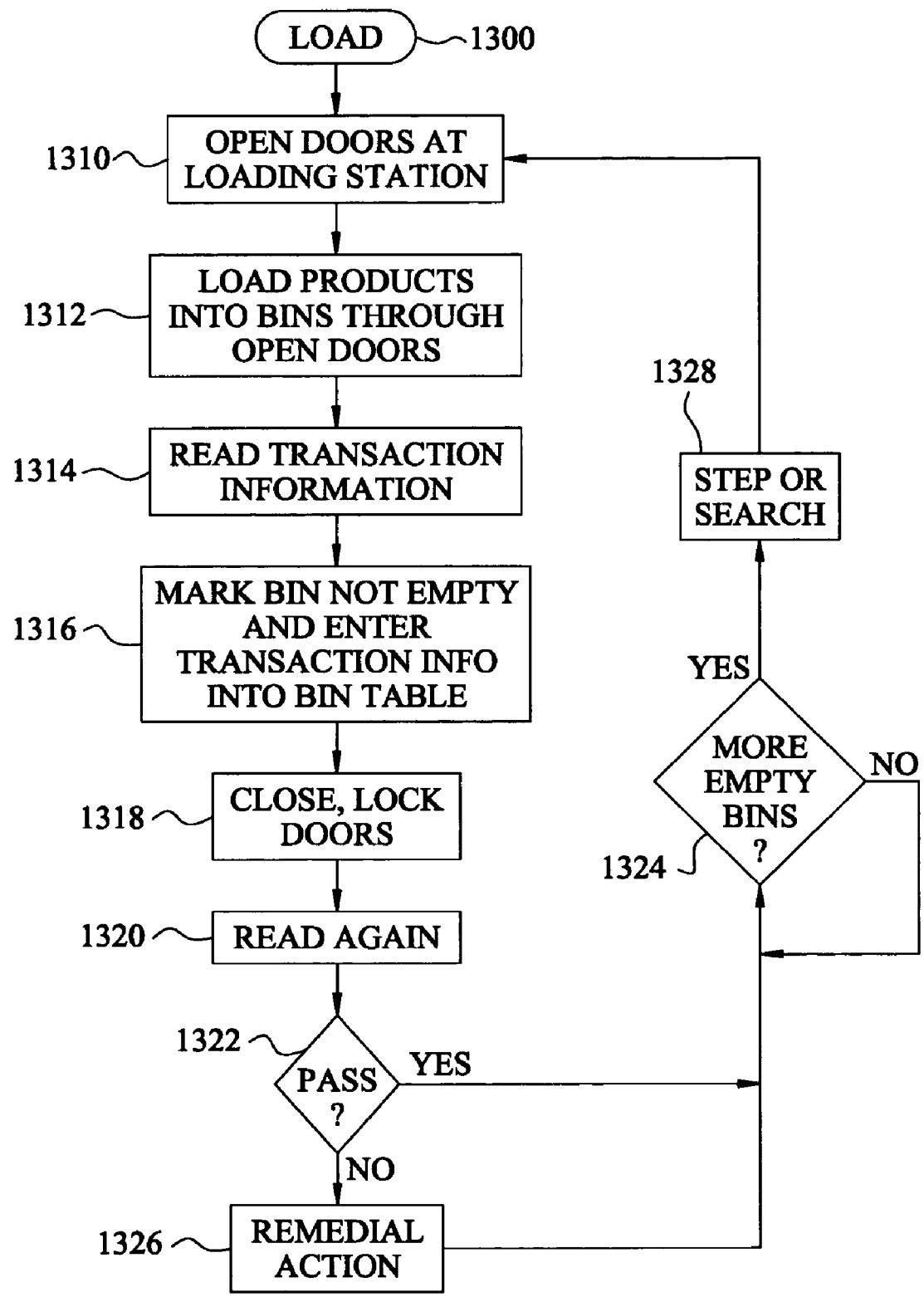
FIGS. 13A and 13B are flow diagrams illustrating methods, executable by a programmed processor and embodied in a software program product, for operating the dispensing apparatus to securely dispense products.
Figure 13B:
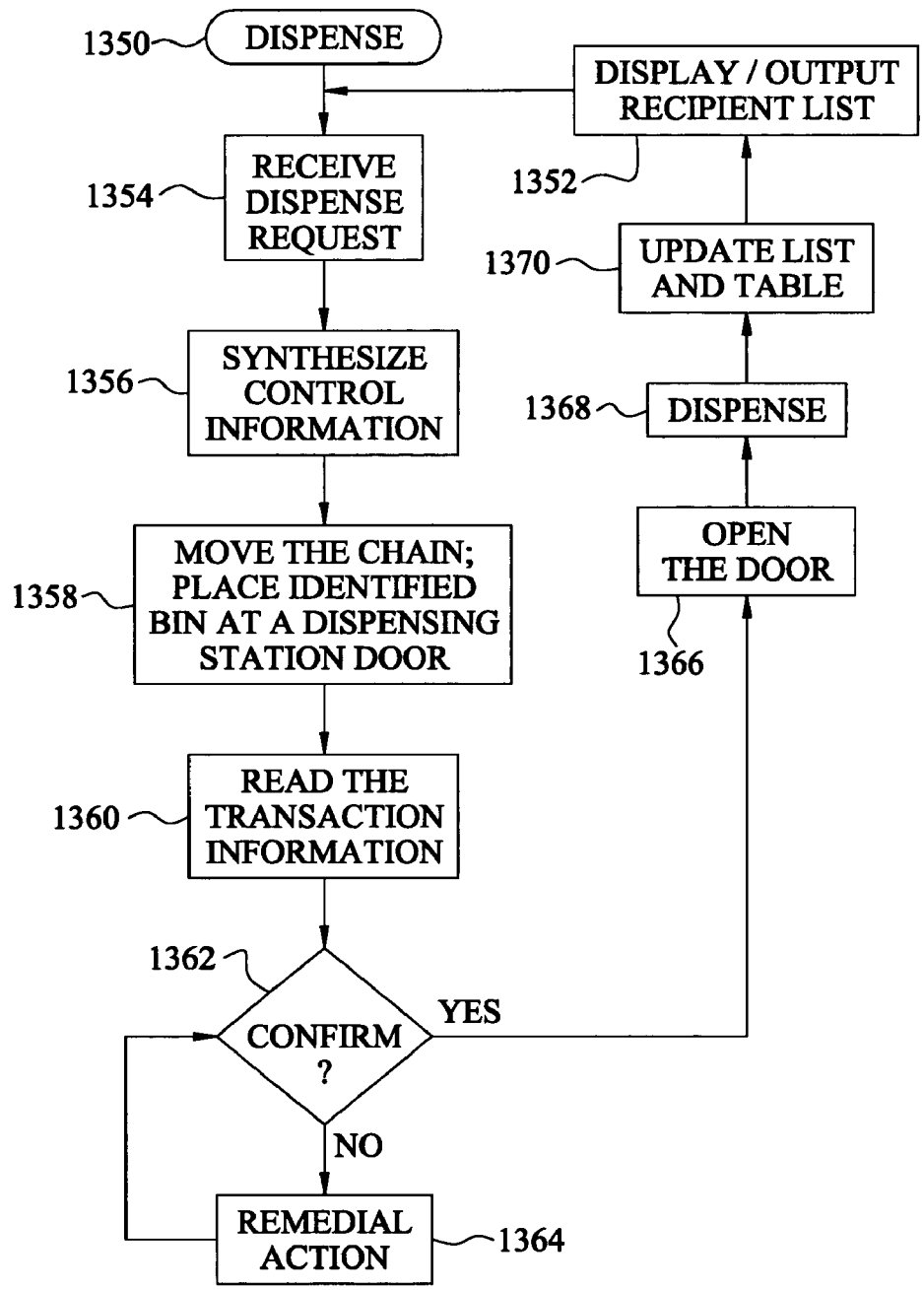

Operations of a system and acts of methods for dispensing products from a dispensing apparatus such as the apparatus 100 are illustrated in the flow diagrams of FIGS. 13A and 13B. For convenience, the operations and/or methods are referred to as "procedures". These figures also represent software programming that may be entered into the processor 1010 to configure it for executing instructions to operate the system and to perform the method. Such instructions may be provided in a software program stored on a program product that may be coupled to a processor for programming the processor. For convenience and a clear understanding, the procedures of these figures are explained with reference to the dispensing apparatus 100 and the system 1001.

In FIG. 13A, a LOAD procedure is illustrated. This procedure begins at step 1300 with initialization of the data structure 1012 and the recipient list 1042. With the chain stationary and a bin array positioned at the loading station, the doors at the loading station are opened at step 1310 so that products may be loaded into the bins exposed by the open doors. In step 1312, the products are received in bins situated at the loading station, being loaded so that their transaction information is located at a position where it can be sensed by the information sensors at the loading station. In step 1314, the transaction information is read from each product received in a bin at the loading station. The bin's status is changed to "Not Empty" and Transaction information is entered into the data structure 1012 (hereinafter "the bin table") in step 1316, either from the information sensors at the loading station, from the retailer system 1029, or from other data entry means (not shown) available to the loading personnel. In any case, when products have been loaded into all of the bins to be loaded, the doors at the loading station are closed and locked in step 1318, and the transaction information from the products in those bins is read again (1320) and compared (1322), bin by bin, against the information stored in the bin table 1012 for the bins at the loading station. If the transaction information read from products in the bins at the loading station correlates with the transaction information stored for those bins in the bin table 1012, the positive exit is taken from decision 1322. Otherwise, the negative exit is taken and remedial action is executed at step 1326, Remedial action can consist of any action appropriate to the circumstances, including indicating a bin or bins whose contents are in question and opening doors at the loading station to permit repositioning the product or products in the bins. From the positive exit out of the decision 1322, or when the remedial action is completed, the procedure transitions to decision 1324 to determine whether any bins remain to be filled. If not, the procedure cycles through the decision 1324 through its negative exit. Otherwise, the positive exit is taken from decision 1324 and the chain is moved at step 1328 to place a bin or bins at the loading location for loading.

In FIG. 13B, a DISPENSE procedure is illustrated. This procedure begins at step 1350. If recipient identification information is required for dispensing, the recipient list 1042 may be initialized and then output in step 1354. When a dispense request is received in step 1356, the procedure transitions to step 1356 where control information is synthesized by the processor 1010. A dispense request will constitute information that is sufficient to enable the system 1001 to determine the identity and location of a bin in the chain 300. The dispense request may be as simple as a request for a product, with proof of payment for the product; in this case, the bin table 1012 may be scanned for the identity of the bin nearest the dispense location containing the product. In the case where products loaded into the chain 300 are to be dispensed to an identified recipient, the dispense request will also include information identifying the recipient; in this case, the transaction information stored in the bin table 1012 will include the recipient identification information so that the system 1001 will be able to identify a bin containing the recipient's product. In step 1356, the processor 1010 calculates control information provided to the motor 425 to cause it to move the chain so as to position the identified bin at the dispensing location. In response to the control information, the solenoid 514 is operated to release the locking arm 510 and then the chain 300 is moved by the motor 425 to place the identified bin at the dispensing station by moving the bin array containing the bin to the dispensing station. After the chain 300 has been moved, the motor 425 is deactivated and the solenoid is operated to engage the locking arm 510 with the rim of the hub 411. At the dispensing station, the processor 1010 reads the output of the information sensor at the $y_j$ value of the identified bin. If the transaction information read from the product in the identified bin at the dispensing station correlates with the transaction information stored for that bin in the bin table 1012, the positive exit is taken from decision 1362. Otherwise, the negative exit is taken and remedial action is executed at step 1364, Remedial action can consist of any action appropriate to the circumstances, including moving the bin to the loading station for checking its contents. From the positive exit out of the decision 1362, or when the remedial action is completed, the procedure transitions to step 1366 where the door at the location is opened. The user is then able to retrieve the contents of the bin in the dispensing step 1368. At this step, when the contents of the bin are removed, the information sensor monitoring the opened bin reads or senses the information on the bin indicating that the bin is empty. After this, in step 1370, the door is closed and the recipient list 1042 is updated to reflect the dispensation of the product from the bin and the bin table 1012 is updated to indicate that the bin is empty. Of course, the procedure may include steps to provide for other possible outcomes, such as failure of the door to open after elapse of a predetermined time, and failure to remove a product even after the door is opened and closed.

One desirable use of the dispensing apparatus, system and methods described above is to dispense products securely, which is afforded by automatic operation of the doors at the loading and dispensing stations, and control of the action by the transaction information and dispensing request. The door opening mechanism prevents random, self-initiated, unauthorized access to products in the chain of bins. The synthesizing of control information from transaction information and dispensing requests enables the further limitation of dispensing to defined conditions, including limitation to specifically authorized recipients. Authorization of recipients may be implemented in formatting the transaction information and formulating the dispensing request by means of controls that are specifically tailored to the products being dispensed.

For example, if the dispensing apparatus is deployed for dispensing prescribed pharmaceutical products in a commercial retail establishment such as a drug store, the transaction information on the products would include information respecting the product and would also include information identifying the recipient. In order to satisfy requirements for privacy, the identification could be encrypted. The authorization required for generating a dispense request for the product could include receipt and check of a signature, entry of a personal identification number, and swiping a credit card. These actions would enable the processor 1010 to formulate and encrypt information identifying the recipient. When the prescription is delivered to a pharmacist, the product is prepared and packaged, transaction information is generated and placed on the package, the package is loaded into a bin in the chain of bins, and the bin table is updated with the transaction information for the bin. At the same time, the recipient's name is added to the recipient list 1042. Then, a recipient or recipient agent enters the establishment to retrieve the "prescription", checking the recipient list 1042 for the recipient's name, and completing the authorization requirements at the user terminal 1016 to generate a dispense request including recipient identification information. The processor 1010 receives the recipient request, scans the bin list for transaction information containing the recipient identification information and identifying the bin containing the product. In response to the dispense request and the transaction information, the processor synthesizes control information that causes the chain to rotate and place the identified bin at the dispensing station. The door where the bin is located is opened, and the DISPENSE procedure is completed as described above in connection with FIG. 13B.

Secure Placement

Figure 14:
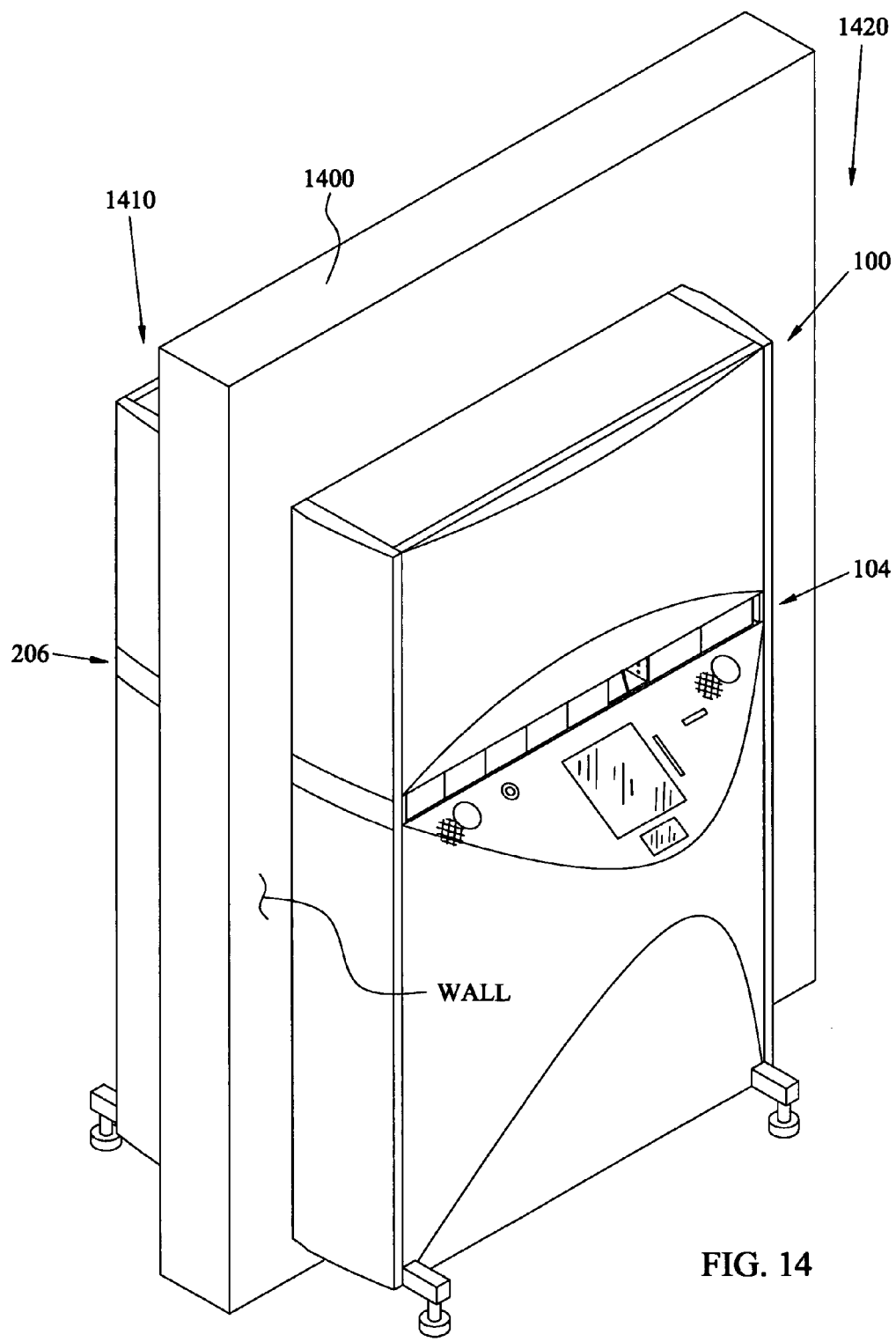
FIG. 14 is a side perspective view of a dispensing apparatus installed in a location for serving users.

FIG. 14 shows one deployment scenario for the dispensing apparatus which is particularly useful for the secure dispensing uses described above. In this case, the dispensing apparatus is positioned in a wall represented by the wall portion 1400 which separates a secure space 1410 from a public space 1420. The dispensing apparatus is positioned in the wall such that the dispensing station 104 is disposed in the public space 1420 while the loading station 206 is disposed in the secure space 1410.

Perpetual Inventory

Figure 15:
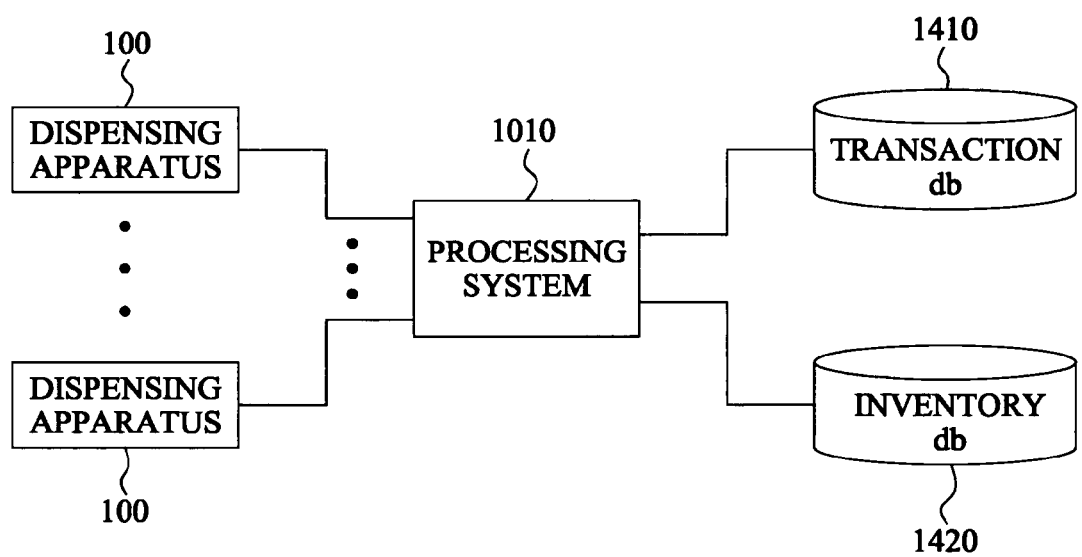
FIG. 15 is a diagram of a dispensing system configured for perpetual inventory.

The combination of a dispensing apparatus with individually-monitored bins and a processing system with manifold functionality supports the execution of a perpetual inventory protocol. Perpetual inventory is a form of stock control in which running records are kept of all load and dispense operations continuously or within specified time periods. FIG. 15 illustrates a system configuration in which one or more dispensing apparatus 100 are connected to a processing apparatus 1010. A unified transaction database 1410 is maintained and managed by the processing system 1010. The transaction database contains relational data structures for each dispensing apparatus 100, or, alternatively, a unified data structure for one or more dispensing apparatus. A unified inventory database contains relational inventory data structures for recording inventory data respecting products dispensed from the apparatus 100. A perpetual inventory is enabled by the fact that every time a chain is moved in a dispensing apparatus, the information sensors at the dispensing and loading stations can read or sense the transaction information on products or packages in the bins that pass by, as well as the Empty status of bins with no contents. Thus, when a load operation is conducted, the transaction information of products or packages being loaded can be parsed for inventory information. Similarly, when a chain is being moved to place a bin at the dispensing location, each bin array that passes the dispensing and loading stations can be sensed for transaction information on bin contents and bin status and the information can be parsed for inventory information. Similarly, a chain can be moved periodically simply to obtain inventory information. Inventory information obtained from chain movement can be processed by the processing system and aggregated in the inventory database. A method of maintaining a perpetual inventory using the system of FIG. 15, would include moving a chain of bins with products past a dispensing or loading station, sensing transaction information on contents of the bins at the dispensing or loading station, obtaining inventory information from the transaction information, and storing the inventory information in an inventory database.

Although a novel apparatus, system and method for securely dispensing products have been described with reference to illustrations and examples, it should be understood that various modifications can be made without departing from the spirit of the principles embodied in these illustrations and examples. Accordingly, the scope of those principles is limited only by the following claims.

The invention claimed is:

1. A dispensing apparatus, comprising:
   a housing;
   a chain of bins in the housing;
   a dispensing station on the housing;
   a loading station on the housing:
   an entry device for generating dispense requests;
   means near the loading station for reading transaction information from marks on products when the products are in the bins;
   bin array data structure means for storing the transaction information obtained by the reading means in association with the locations of the bins that contain the products;
   a controller means coupled to the entry device, to the reading means, and to the bin array data structure means for:
      placing transaction information read by the reading means into the bin array data structure means in association with the locations of the bins in which the products are loaded; and,
      producing control information in response to a dispense request and the transaction information stored by the bin array data structure means, the control information indicating a bin containing a product;
   a mechanism in the housing coupled to the chain for moving the chain to place a the bin at the dispensing station in response to the control information; and,
   a door mechanism at the dispensing station for providing access to the bin in response to the control information.

2. The dispensing apparatus of claim 1, wherein the chain is an endless chain having a longitudinal direction of rotation and including a series of bin arrays, each bin array including one or more bins disposed transversely to the direction of rotation.

3. The dispensing apparatus of claim 2, each bin in a bin array including an elongated box having an open front portion.

4. The dispensing apparatus of claim 3, further including a package for containing a product to be dispensed, the package including a mark with transaction information and a retainer for acting to retain the mark within a predetermined position in the box where the transaction information can be read.

5. The dispensing apparatus of claim 1, the reading means including an optical information reader near the loading station for reading transaction information from products in bins at the loading station.

6. The dispensing apparatus of claim 1, the reading means including an optical information reader having a line of sight into bins at the loading station for reading transaction information from products loaded into the bins.

7. The dispensing apparatus of claim 6, wherein the chain is an endless chain having a longitudinal direction of rotation and including a series of bin arrays, each bin array including one or more bins disposed transversely to the direction of rotation.

8. The dispensing apparatus of claim 7, each bin in a bin array including an elongated box having an open front portion and a retainer means for retaining a package against a side of the box.

9. The dispensing apparatus of claim 1, wherein the mechanism for moving the chain is a rotation mechanism.

10. A dispensing apparatus, comprising:
a housing;
a chain of bins in the housing;
a loading station on the housing for loading the bins with products;
a dispensing location on the housing;
an entry device for generating a dispense request including information identifying a recipient;
means in the housing adjacent the loading station for reading transaction information on products after the products are in the bins;
a controller means coupled to the entry device and to the reading means for producing control information in response to information identifying a recipient and the transaction information;
a mechanism coupled to the chain for moving the chain to place a bin at the dispensing location in response to the control information; and,
a door mechanism at the dispensing location having a first state blocking access to all bins at the dispensing location and a second state for providing access to the bin at the dispensing location in response to the control information.

11. The dispensing apparatus of claim 10, wherein the chain is an endless chain having a longitudinal direction of rotation and including a series of bin arrays, each bin array including one or more bins disposed transversely to the direction of rotation.

12. The dispensing apparatus of claim 11, each bin in a bin array including an elongated box having an open front portion.

13. The dispensing apparatus of claim 12, further including a package for containing a product to be dispensed, the package including a mark with transaction information and retainer for acting to retain the mark within a predetermined position in the box where the transaction information can be read.

14. The dispensing apparatus of claim 10, the reading means including an array of bar code scanners near the dispensing location for reading transaction information from products in bins at the dispensing location.

15. The dispensing apparatus of claim 10, the means including an array of bar code scanners near the loading station for reading transaction information from products in bins at the loading station.

16. The dispensing apparatus of claim 15, wherein the mechanism coupled to the chain is a rotation mechanism and the chain is an endless chain having a longitudinal direction of rotation and including a series of bin arrays, each bin array including one or more bins disposed transversely to the direction of rotation.

17. The dispensing apparatus of claim 16, each bin in a bin array including an elongated box having an open front portion and a retainer means for retaining a package against a side of the box.

18. The dispensing apparatus of claim 15, the reading means including an array of bar code scanners near the dispensing location for reading transaction information from products in bins at the dispensing location.

19. An apparatus for securely dispensing products, comprising:
a housing;
an endless chain of bins in the housing;
a loading station on the housing for loading the bins with packages labeled with transaction information;
a dispensing station on the housing;
a device for providing a dispense request including information identifying a recipient;
an information reading mechanism adjacent the loading station for reading transaction information from products when the products are in the bins;
a bin array data structure storing the transaction information of products in bins in association with the locations of the bins in the chain of bins;
a controller coupled to the device, the reading mechanism, and the bin array data structure for:
placing transaction information read by the reading mechanism into the bin array data structure means in association with the locations of the bins in which the products are loaded; and,
producing control information in response to the identification information and to the transaction information stored by the bin array data structure, the control information indicating a bin containing a product;
a rotation mechanism coupled to rotate the endless chain to place a bin at the dispensing station in response to the control information; and
a door mechanism at the dispensing station for providing access to the bin in response to the control information.

20. The apparatus of claim 19, wherein the endless chain has a longitudinal direction of rotation and includes a series of bin arrays, each bin array including one or more bins disposed transversely to the direction of rotation.

21. The apparatus of claim 20, each bin in a bin array including an elongated box having an open front portion.

22. The apparatus of claim 21, further including a package for containing a product to be dispensed, the package including a mark with transaction information and retainer for acting to retain the mark within a predetermined position in the box where the transaction information can be read.

23. The apparatus of claim 19, further including an information reading mechanism near the dispensing station for reading transaction information from products in bins at the dispensing location.

24. The apparatus of claim 23, wherein the endless chain has a longitudinal direction of rotation and includes a series of bin arrays, each bin array including one or more bins disposed transversely to the direction of rotation.

25. The apparatus of claim 24, each bin in a bin array including an elongated box having an open front portion and a marking on the box to indicate when the box is empty.

26. The apparatus of claim 25, further including a package for containing a product to be dispensed, the package including a mark with transaction information and retainer for acting to retain the mark within a predetermined position in the box where the transaction information can be read.

27. A method for dispensing products, comprising:
reading transaction information from products when the products have been loaded to a chain;
storing the transaction information in a data structure in which the transaction information is associated with the locations in the chain where products are loaded;
receiving a dispense request for a product in the chain;
synthesizing control information in response to the transaction information in the data structure and the dispense request;
the control information identifying a location of at least one product in the chain for the recipient; and
moving the chain in response to the control information so that the location is placed at a locked dispensing location.

28. The method of claim 27, further including providing access to the dispensing location in response to the control information.

29. A method for securely dispensing products from an endless chain of bins, comprising:
reading transaction information on products when the products have been loaded to the bins;
storing the transaction information in a data structure in which the transaction information is associated with the locations in the chain where products are loaded;
receiving information identifying a recipient;
synthesizing control information from the transaction information in the data structure and the identifying information;
the control information identifying the location of at least one bin containing a product for the recipient;
moving the endless chain in response to the control information so that the at least one bin is positioned at a locked dispensing location; and
providing access to the dispensing location in response to the control information.

30. A storage medium containing instructions for:
receiving transaction information read from packages when the packages have been loaded to an endless chain;
storing the transaction information in a data structure in which the transaction information is associated with the locations in the endless chain where products are loaded;
receiving information identifying a recipient of at least one package;
synthesizing control information from the transaction information in the data structure and the identifying information;
the control information identifying a bin location in the endless chain of at least one package for the recipient; and
causing rotation of the endless chain in response to the control information so that the bin location is placed at a locked dispensing location.

31. The medium of claim 30, the instructions further including instructions for providing access to the dispensing location in response to the control information.

32. A program product including a storage medium containing a program of software instructions for securely dispensing pharmaceutical products from an endless chain of bins, the program including instructions for:
receiving transaction information read from labels of packages containing pharmaceutical products after the packages have been loaded to the bins;
storing the transaction information in a data structure in which the transaction information is associated with the locations of bins where products are loaded;
receiving a dispense request including information identifying a recipient;
synthesizing control information from the transaction information in the data structure and the identifying information;
the control information identifying at least one bin containing a package for the recipient;
causing movement of the chain in response to the control information so that the at least one bin is positioned at a locked dispensing location; and
unlocking the dispensing location in response to the control information.

33. A dispensing apparatus, comprising:
a housing;
a chain of bins in the housing;
a dispensing station on the housing;
a loading station on the housing;
an entry device for generating dispense requests;
a first reading means near the loading station, with a line of sight into the chain of bins for reading transaction information from products after the products are loaded in the bins;
a second reading means near the dispensing station, with a line of sight into the chain of bins for reading transaction information from products in bins at the dispensing station;
a bin array data structure for storing the transaction information obtained by the first reading means in association with the locations of the bins in the chain of bins;
controller means coupled to the entry device, to the first and second reading means, and to the bin array data structure for:
placing transaction information read by the first reading means into the bin array data structure in association with the locations of the bins in which the products are loaded;
producing control information in response to a dispense request and transaction information stored by the bin array data structure, the control information identifying a bin location in the chain of bins;
means in the housing for moving the chain to place the identified bin location at the dispensing station in response to the control information;
one or more locked doors at the dispensing station; and,
means for unlocking a door at the dispensing station to provide access to the identified bin location in response to transaction information read by the second reading means from a product in the bin at the bin location.

34. The dispensing apparatus of claim 33, wherein the first reading means includes a first array of bar code scanners inside the housing at the loading station, and the second reading means includes a second array of bar code scanners inside the housing at the dispensing station.

35. The dispensing apparatus of claim 33, further including a package for containing a product to be dispensed, the package including a mark with transaction information and retainer for acting to retain the mark within a predetermined position in the bin where the transaction information can be read.

36. The dispensing apparatus of claim 35, wherein each bin in the chain of bins includes an open front and a means near the open front for engaging a retainer of a package.

37. The dispensing apparatus of claim 36, wherein the chain is an endless chain having a longitudinal direction of rotation and including a series of bin arrays, each bin array including one or more bins disposed transversely to the direction of rotation.

38. The dispensing apparatus of claim 37, wherein the mechanism for moving the chain is a rotation mechanism.

39. The dispensing apparatus of claim 33, wherein the unlocking means includes:
   process means for indicating whether transaction information stored in the bin array data structure in association with the location of an identified bin matches transaction information read by the second reading means from a product in the identified bin when the identified bin is at the dispensing station; and
   lock means engaging the one or more doors for keeping the one or more doors locked if the match is unsuccessful or unlocking a door providing access to the identified bin if the match is successful.

40. The dispensing apparatus of claim 39, wherein the first reading means includes a first array of bar code scanners inside the housing with a line of sight into bins at the loading station, and the second reading means includes a second array of bar code scanners inside the housing with a line of sight into bins at the dispensing station.

41. The dispensing apparatus of claim 40, further including a package for containing a product to be dispensed, the package including a mark with transaction information and retainer for acting to retain the mark within a predetermined position in the bin where the transaction information is in the line of sight of the first array of bar code scanners when the bin is at the loading station and is in the line of sight of the second array of bar code scanners when the bin is at the dispensing station.

42. The dispensing apparatus of claim 40, wherein each bin in the chain of bins includes an open front and a means near the open front for engaging a package.

43. The dispensing apparatus of claim 42, further including a package for containing a product to be dispensed, the package including a mark with transaction information and retainer for cooperating with an engaging means of a bin to retain the mark within a predetermined position in the bin where the transaction information is in the line of sight of the first array of bar code scanners when the bin is at the loading station and is in the line of sight of the second array of bar code scanners when the bin is at the dispensing station.

* * * * *